(12) United States Patent
Malin

(10) Patent No.: US 9,935,447 B2
(45) Date of Patent: Apr. 3, 2018

(54) ATTACHMENT DEVICE FOR A CABLE

(71) Applicant: Allied Bolt, Inc., Lake Success, NY (US)

(72) Inventor: Glen Malin, Lake success, NY (US)

(73) Assignee: ALLIED BOLT, INC., Lake Success, NY (US)

( * ) Notice: Subject to any disclaimer, the term of this patent is extended or adjusted under 35 U.S.C. 154(b) by 0 days.

(21) Appl. No.: 14/975,082

(22) Filed: Dec. 18, 2015

(65) Prior Publication Data
US 2017/0179704 A1 Jun. 22, 2017

(51) Int. Cl.
*H02G 3/32* (2006.01)
*H02G 7/05* (2006.01)
*F16B 1/00* (2006.01)

(52) U.S. Cl.
CPC ............. *H02G 7/053* (2013.01); *F16B 1/00* (2013.01); *H02G 3/32* (2013.01)

(58) Field of Classification Search
USPC ... 248/49, 65, 67, 67.5, 67.7, 68.1, 71, 74.1, 248/74.2, 74.4, 74.5
See application file for complete search history.

(56) References Cited

U.S. PATENT DOCUMENTS

| | | | | |
|---|---|---|---|---|
| 1,205,496 A | * | 11/1916 | Whitehead | F16G 11/00 24/129 R |
| 2,158,012 A | * | 5/1939 | Morgenstern | H01B 17/20 174/164 |
| 2,174,192 A | * | 9/1939 | Meighan | F16G 11/00 24/129 R |
| 2,174,723 A | * | 10/1939 | Hocher | H01B 17/20 174/154 |
| 2,198,839 A | * | 4/1940 | Pittman | H01B 17/22 174/158 R |
| 2,481,610 A | * | 9/1949 | Meighan | F16G 11/00 24/129 R |
| 3,309,745 A | * | 3/1967 | Gintz | H02G 7/056 174/79 |
| D297,811 S | * | 9/1988 | Payan | D8/356 |
| 5,090,645 A | * | 2/1992 | Zuercher | F16L 3/223 174/166 R |
| 5,765,786 A | * | 6/1998 | Gretz | H02G 3/26 248/68.1 |
| 6,394,724 B1 | * | 5/2002 | Kelly | F16B 41/002 411/107 |
| 6,648,279 B1 | | 11/2003 | Malin et al. | |
| 6,732,981 B2 | | 5/2004 | Franks et al. | |

(Continued)

*Primary Examiner* — Alfred J Wujciak
(74) *Attorney, Agent, or Firm* — Baker Botts L.L.P.

(57) ABSTRACT

Device for attaching a cable to a structure using an implement that includes a first body segment having a first end, a second end, and an inner wall, and defines a recess extending from the first end to the second end. The implement is receivable within the recess from the first end and permitted to extend beyond the second end to attach the device to the structure. A second body segment is coupled to the first body segment by a joining member, the second body segment having a first end, a second end, an inner wall, and defining a second body channel adapted to receive the cable. The inner wall of the first body segment, the inner wall of the second body segment, and the joining member define a first channel adapted to receive the cable.

20 Claims, 11 Drawing Sheets

(56) References Cited

U.S. PATENT DOCUMENTS

| | | | | |
|---|---|---|---|---|
| 6,763,776 B1* | 7/2004 | Perri | .................... | B63B 21/08 |
| | | | | 114/218 |
| 2007/0007397 A1* | 1/2007 | Nelson | ................ | F16L 3/2235 |
| | | | | 248/68.1 |
| 2008/0203243 A1* | 8/2008 | Cho | ........................ | F16L 3/12 |
| | | | | 248/63 |

* cited by examiner

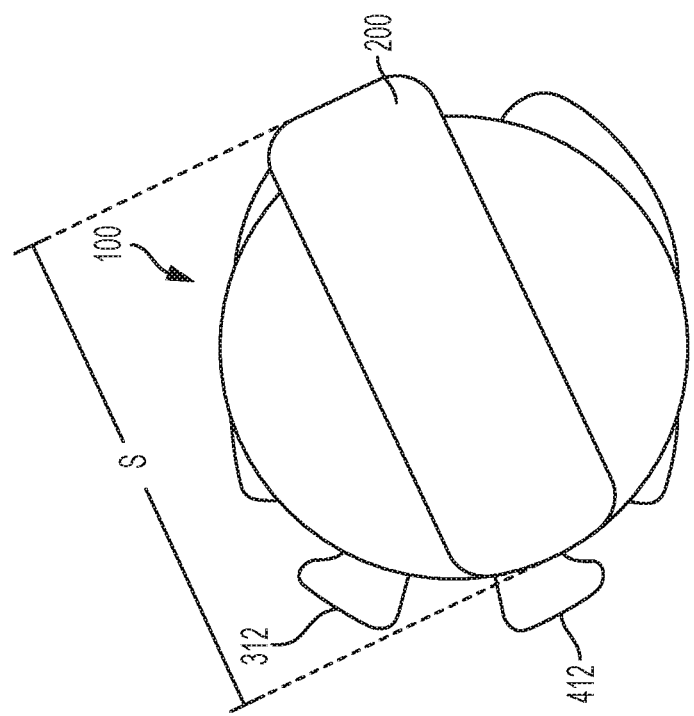

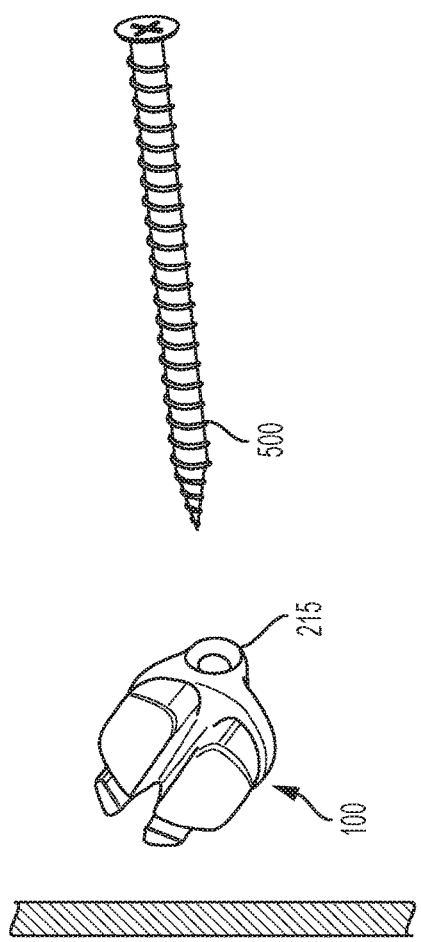
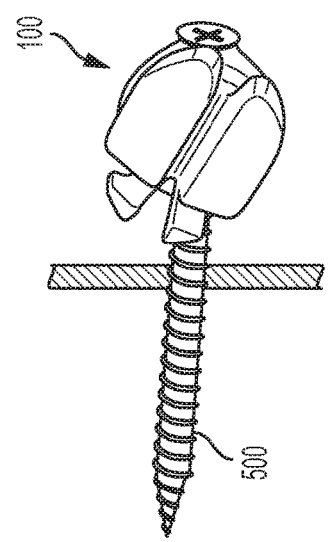
FIG. 9
FIG. 10

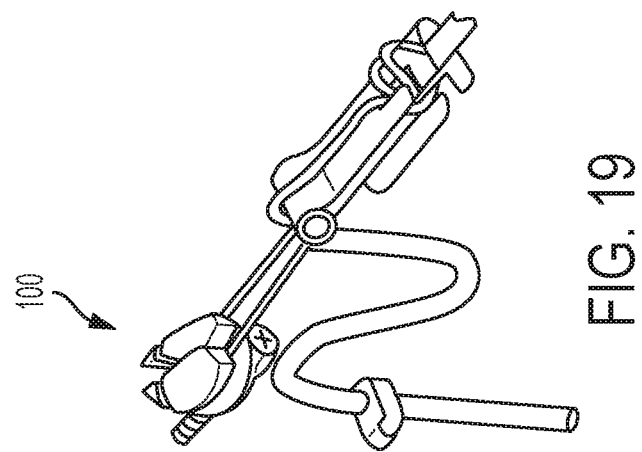

ATTACHMENT DEVICE FOR A CABLE

BACKGROUND OF THE DISCLOSED SUBJECT MATTER

Field of the Disclosed Subject Matter

The disclosed subject matter relates to a device for attaching a cable to a structure.

Description of the Related Art

Devices for attaching a cable to a structure, such as a cable from a utility pole to a house or structure, are known in the art. Certain attachment devices are constructed principally from metal, and therefore cannot provide insulation for the structure if an unexpected power surge occurs and travels via a support member of a hybrid cable from a utility pole to the structure. Furthermore, certain devices attempt to provide some insulation for a support member by utilizing a bulky second element with a drop wire clamp.

Thus, there remains a continued need for an efficient system for providing a suitable device.

SUMMARY OF THE DISCLOSED SUBJECT MATTER

The purposes and advantages of the disclosed subject matter will be set forth in and are apparent from the description that follows, as well as will be learned by practice of the disclosed subject matter.

The disclosed subject matter provides devices for attaching a cable to a structure using an implement. In an exemplary embodiment, a device includes a first body segment having a first end, a second end, and an inner wall, and defining a recess extending from the first end to the second end, the implement receivable within the recess from the first end and permitted to extend beyond the second end to attach the device to the structure. The example device also includes a second body segment coupled to the first body segment by a joining member, the second body segment having a first end, a second end, an inner wall, and defining a second body channel adapted to receive the cable. In certain embodiments, the inner wall of the first body segment, the inner wall of the second body segment, and the joining member define a first channel adapted to receive the cable.

The disclosed subject matter also provides device systems for attaching a cable to a structure. In an exemplary embodiment, a system includes a first body segment having a first end, a second end, and an inner wall, and defining a recess extending from the first end to the second end. The device also includes a second body segment coupled to the first body segment by a joining member, the second body segment having a first end, a second end, an inner wall and a second body channel adapted to receive the cable.

In certain embodiments, the inner wall of the first body segment, the inner wall of the second body segment, and the joining member define a first channel adapt to receive the cable. The second body segment can further have a transverse sidewall including: a first leg having a first foot, the first leg being coupled to the first foot by a linking member, the first leg having a longitudinal sidewall, and a second leg coupled to the first leg by a mid-member, the second leg having a second foot and coupled to the foot by a linking member, the second leg having a longitudinal sidewall. The longitudinal sidewall of the first leg, the longitudinal side-wall of the second leg, and the mid-member can define a first portion of the second body channel. The inner sidewalls of the first and second foot, the transverse sidewall of the second body segment, and the linking members of the first and second foot can define a second portion of the second body channel. An implement receivable within the recess from the first end of the first body segment can be permitted to extend beyond the second end of the first body segment to attach the device to the structure.

It is to be understood that both the foregoing general description and the following detailed description and drawings are examples and are provided for purpose of illustration and not intended to limit the scope of the disclosed subject matter in any manner.

The accompanying drawings, which are incorporated in and constitute part of this specification, are included to illustrate and provide a further understanding of the devices of the disclosed subject matter. Together with the description, the drawings serve to explain the principles of the disclosed subject matter.

BRIEF DESCRIPTION OF THE DRAWINGS

The subject matter of the application will be more readily understood from the following detailed description when read in conjunction with the accompanying drawings, in which:

FIG. 8 is a back view of the device of FIG. 2, according to an embodiment of the disclosed subject matter.

FIGS. 9-16 depict the steps of coupling the device of FIG. 1A with an implement and attaching the device to the structure, according to an embodiment of the disclosed subject matter.

FIGS. 17-19 depict the steps of coupling the device of FIG. 1A with an implement and a clamp and attaching the device to the structure, according to another embodiment of the disclosed subject matter.

DETAILED DESCRIPTION

Reference will now be made in detail to embodiments of the disclosed subject matter, an example of which is illustrated in the accompanying drawings. The disclosed subject matter will be described in conjunction with the detailed description of the system.

Devices as described herein can be used for example to attach a cable, such as a cable from a utility pole, to a structure, such as a house. For example, the device can be used by inserting an implement, such as a screw, within the device and attaching the device to a house. The cable can then be placed within a series of channels of the device for secure engagement.

Figure 1B:
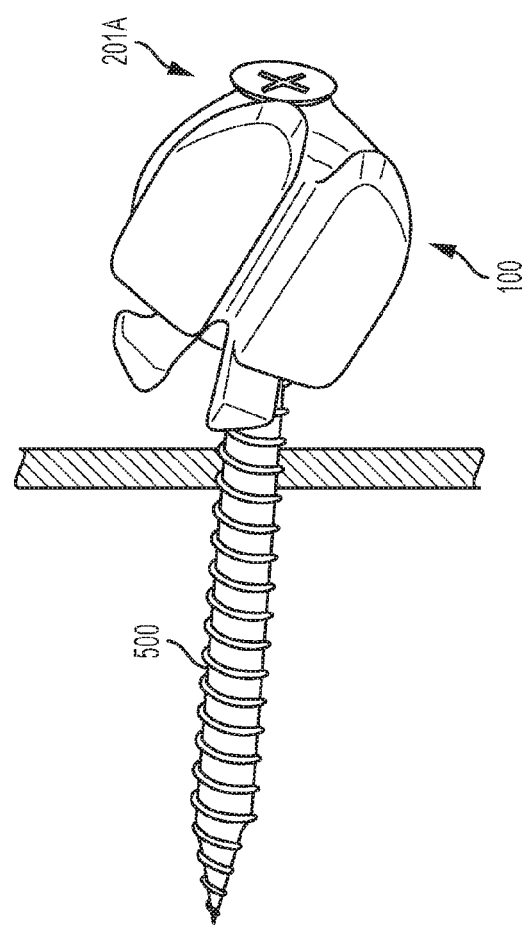
FIG. 1B is a perspective view of the device of FIG. 1 with an implement received within the device, according to an embodiment of the disclosed subject matter.
Figure 1A:
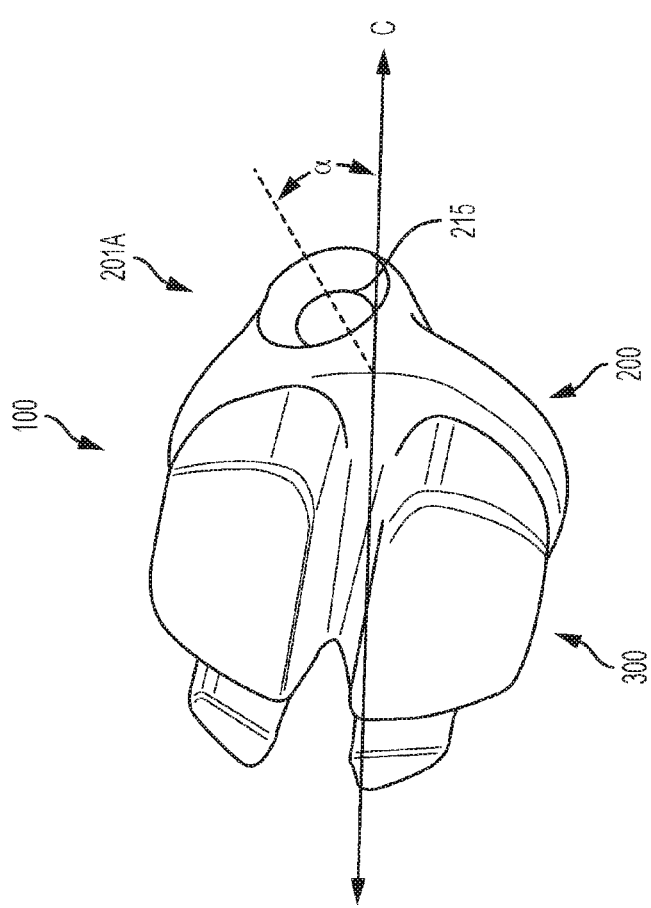
FIG. 1A is a perspective, left view of the device, according to an embodiment of the disclosed subject matter.
Figure 2:
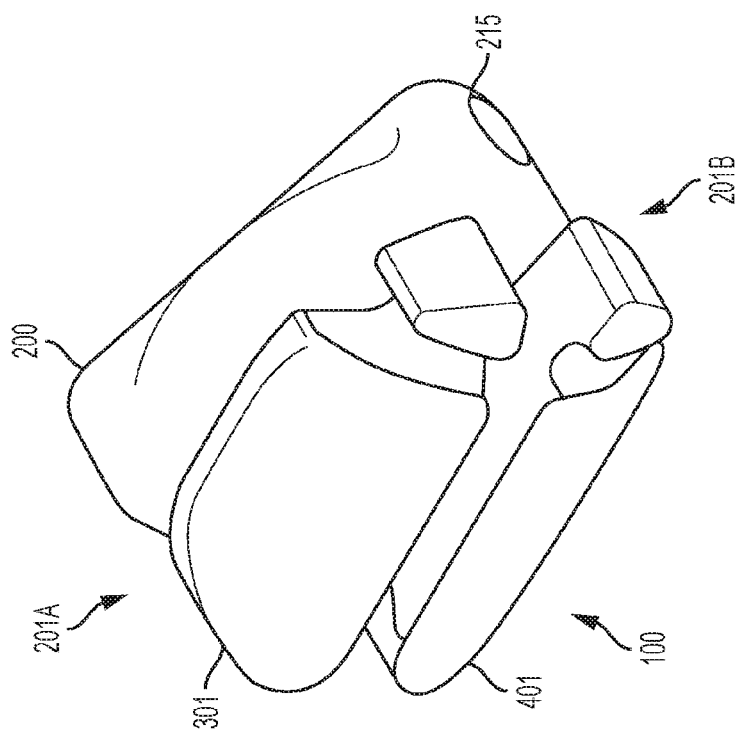
FIG. 2 is a perspective, right view of the device, according to an embodiment of the disclosed subject matter.

Solely for purpose of illustration, an embodiment of a device for attaching a cable to a structure using an implement, is shown schematically in the perspective views of FIG. 1A, FIG. 1B, and in FIG. 2. Particularly, and as illustrated, the device 100 comprises a first body segment 200 and a second body segment 300, as further discussed herein.

Figure 3:
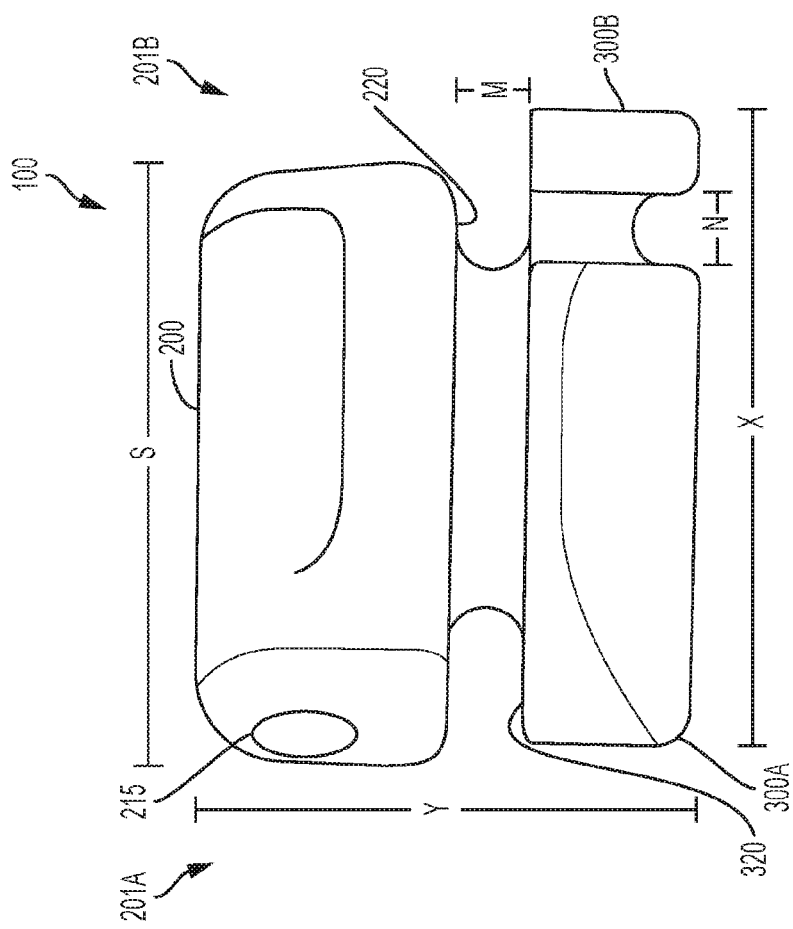
FIG. 3 is a top view of the device of FIG. 2, according to an embodiment of the disclosed subject matter.

FIG. 3 depicts a top, plan view of the device of FIG. 2. As shown, the first body segment 200 has a first end 201A, a second end 201B, and an inner wall 220. The first body segment further defines a recess 215 extending from the first end 201A to the second end 201B of the first body segment. FIG. 1A and FIG. 2 are perspective views of the device shown from the right and left sides, respectively. In FIG. 1, the recess 215 is shown from the first end 201A of the first body segment, whereas FIG. 2 shows the recess 215 from the second end 201B of the first body segment. The recess 215 can house an implement therein to secure the device to the structure, as discussed further below. Although only one recess is shown in the figures, it is contemplated herein for the first body segment can include more than one recess adjacent to each other to receive more than one implement, as desired.

FIG. 1B depicts the device of FIG. 1A assembled with an implement 500 received within the recess 215. As such, the implement 500 is receivable within the recess from the first end 201A of the device and is permitted to extend beyond a second end 201B. The portion of the implement extending beyond the second end 201B of the device can be conveniently affixed to a structure, such as for purposes of example, the siding of a house. The implement 500 of FIG. 1B comprises a screw. However, the implement can comprise any suitable instrument, such as but not limited to a screw, a nail, and a bolt.

The recess 215 can be oriented at a predetermined angle α with respect to a longitudinal center C of the device. For example, the angle can range from approximately 20° to approximately 30° with respect to a longitudinal center of the device, and in particular be approximately 25°. The diameter of the recess can range from approximately 0.15 inches to approximately 0.3 inches to accommodate the diameter of the implement received therein, e.g., approximately 0.235 inches. An interior of the recess can include any suitable surface to complement the implement, such as a threaded configuration or a smooth configuration. FIG. 1A depicts the recess as a countersunk recess such that a portion of the first end of the first body segment surrounding the recess includes a sloping surface that is engagable with a surface of an implement. In contrast to the countersunk recess of FIG. 1A, the recess of FIG. 1B depicts a non-sloping surface. Any suitable configuration of the recess is contemplated herein.

Figure 5:
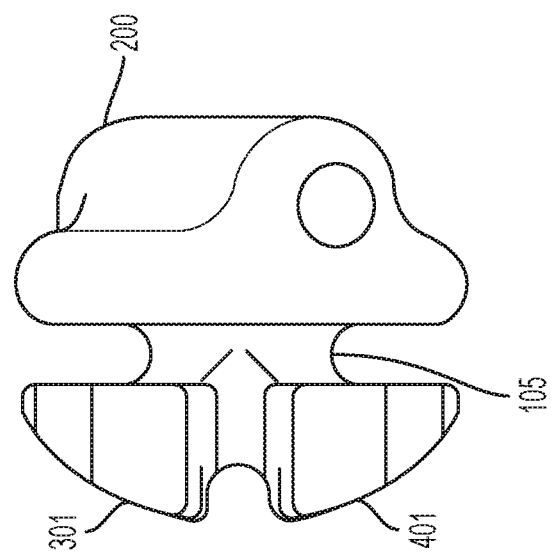
FIG. 5 is a right view of the device of FIG. 2, according to an embodiment of the disclosed subject matter.
Figure 4:
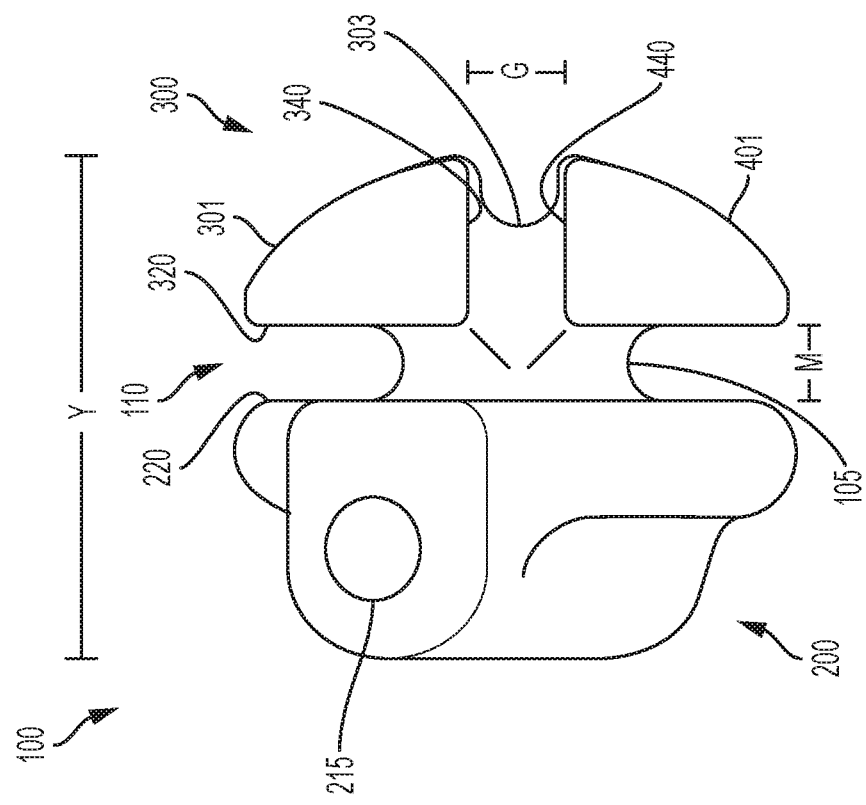
FIG. 4 is a left view of the device of FIG. 2, according to an embodiment of the disclosed subject matter.

According to the disclosed embodiment, FIG. 4 is a left side view of the device and FIG. 5 is a right side view of the device. The device 100 further includes a second body segment 300 coupled to the first body segment 200 by a joining member 105. As shown in FIGS. 3 and 4, the second body segment 300 has a first end 300A, a second end 300B, an inner wall 320, and a transverse sidewall 325. As shown in FIGS. 4 and 5, the inner wall 220 of the first body segment, the inner wall 320 of the second body segment, and the joining member 105 together define a first channel 110 of the device that is adapted to receive the cable.

Figure 7:
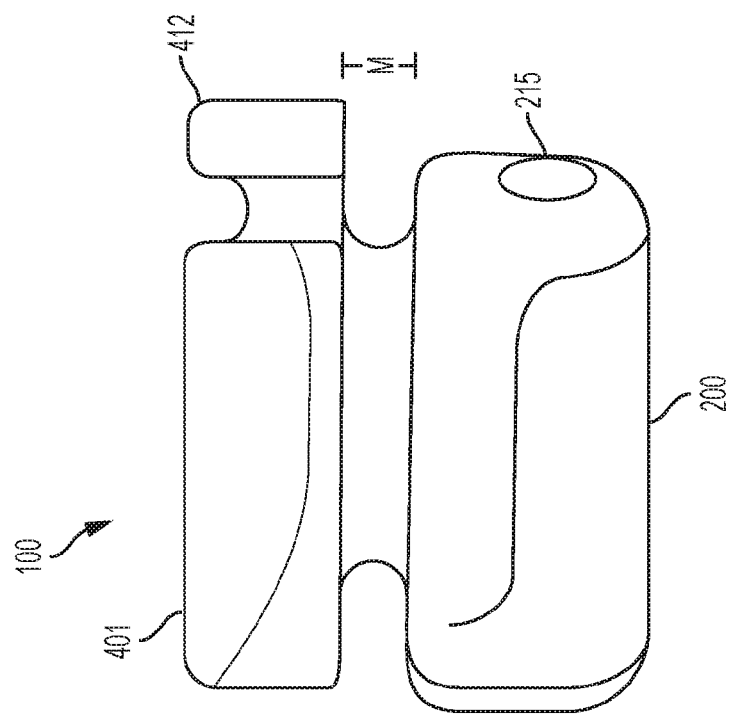
FIG. 7 is a bottom view of the device of FIG. 2, according to an embodiment of the disclosed subject matter.

The cable is engagable with the first channel between the inner walls of the first and second body segments. The joining member with respect to the inner walls of the first channel can include a predetermined radius of curvature that prevents damage to the cable engaged therein. The radius of curvature can be any suitable dimension such as ranging between approximately 0.7 to approximately 1.1, and in particular be approximately 0.9. As best depicted in FIG. 3, the inner wall 220 of the first body segment is spaced from the inner wall 320 of the second body segment by a predetermined distance M ranging between approximately 0.14 inches to approximately 0.22 inches, e.g., approximately 0.18 inches. FIG. 7 further depicts a bottom view of the device showing the predetermined distance M. As such, the predetermined distance between the inner walls 220, 320 is greater than the diameter of the cable disposable therein.

Figure 6:
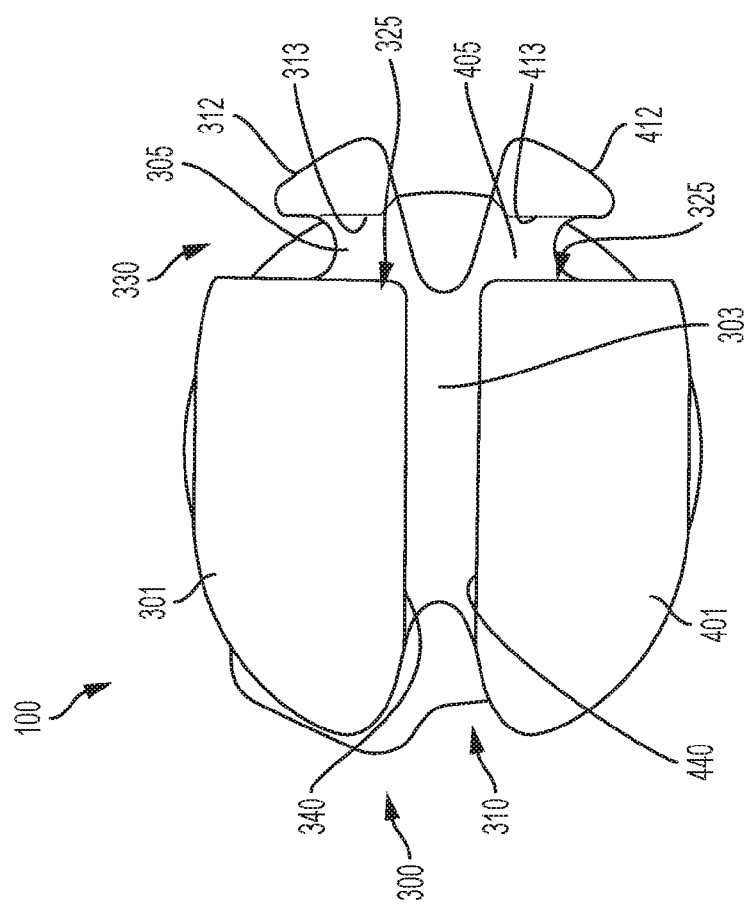
FIG. 6 is a front view of the device of FIG. 2, according to an embodiment of the disclosed subject matter.
Figure 11:
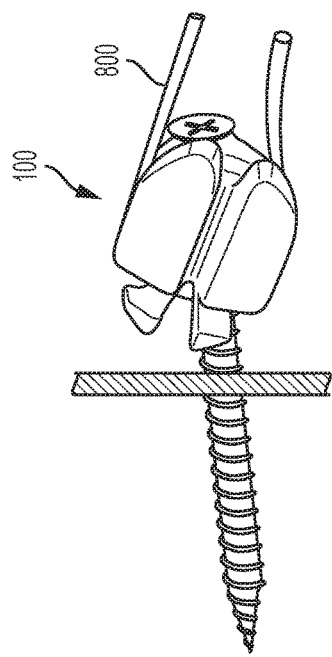

FIG. 6 depicts a front view of the device of FIG. 2 that features the second body segment 300. As shown, the second body segment 300 further includes a first leg 301, a second leg 401, a transverse sidewall 325, and a second body channel. The first leg 301 and second leg 401 are coupled together by a mid-member 303, as depicted in FIGS. 4 and 6. Each of the first leg and the second leg has a longitudinal sidewall 340, 440. The longitudinal sidewalls 340, 440 and the mid-member 303 together define a first portion 310 of the second body channel that can house a cable therein.

The cable is engagable with the first portion of the second body channel between the longitudinal sidewalls of the first and second legs 340, 440. The longitudinal sidewalls of the first portion of the second body channel include a predetermined radius that prevents damage to the cable engaged therein, similar to the radius of the first channel previously described. As best depicted in FIG. 4, the longitudinal sidewall 340 of the first leg is spaced from the longitudinal sidewall 440 of the second leg by a distance G ranging between approximately 0.11 inches to approximately 0.17 inches, e.g., approximately 0.14 inches. In one embodiment, the distance between the longitudinal sidewalls 340, 440 is the same dimension as the distance between the inner walls 220, 320.

As shown in FIG. 6, the first leg 301 has a first foot 312 that is coupled to the first leg by a linking member 305. The first foot further includes an inner sidewall 313. Similarly, the second leg 401 has a second foot 412 that is coupled to the second leg by a linking member 405. The second foot 412 further includes an inner sidewall 413. The first foot and second foot are disposed at the second ends of the first and second body segments. As depicted, the inner sidewalls 313, 413 of the first and second foot, the transverse sidewall 325 of the second body segment, and the linking members 305, 405 of the first and second foot define a second portion 330 of the second body channel that can house a cable therein.

The cable is engagable with the second portion of the second body channel between the transverse sidewall 325 of the second body member and the inner sidewalls 313, 413 of the first and second foot. The inner sidewalls and the transverse sidewall of the second portion of the second body channel include a predetermined radius that prevents damage to the cable engaged therein, similar to the radius of the first channel previously described. As best depicted in FIG. 3, the transverse sidewall 325 of the second body member is spaced from the inner sidewalls 313, 413 of the first and second foot by a distance N ranging between approximately 0.12 inches to approximately 0.20 inches, e.g., approximately 0.16 inches. In one embodiment, the distance M between the inner walls 220, 320, the distance G between the longitudinal sidewalls 340, 440, and the distance N between the transverse sidewall and inner sidewalls 313, 413 are the same dimension.

The device can be any suitable dimension sufficient to sustain a force imposed by the cable coupled thereto, while the device remains affixed to a structure. As depicted in FIG. 3, the device can have a maximum longitudinal length dimension X ranging between approximately 1.15 inches to approximately 1.74 inches, and in particular be approximately 1.45 inches. The device can have a maximum longitudinal width dimension Y ranging between approximately 0.9 inches to approximately 1.4 inches, and in particular be approximately 1.15 inches. The device can have a longitudinal depth dimension ranging between approximately 0.9 inches to approximately 1.5 inches, and in particular be approximately 1.2 inches. The length S of the first body segment 200 can be the same dimension as the maximum longitudinal length dimension X or alternatively a different dimension. As depicted in the top view of FIG. 3 and the back view of FIG. 8, the length S is less than the dimension of the maximum longitudinal length dimension X. The length S can range between approximately 1.1 inches to approximately 1.65, e.g., approximately 1.375 inches.

In accordance with the embodiments of the subject matter previously described, the device can be made out of a plurality of suitable materials. For instance, the device can comprise any suitable material of construction that can provide insulation such as, but not limited to, plastics such as polyethylene, polyvinyl chloride (PVC), polyoxymethylene (POM) such as Delrin®, and the like. In one embodiment, the device comprises a weather resistant and ultraviolet resistant material. Although the device is described herein references several components and features, it is understood that the device comprises a monolithic, one-piece device. The device can be manufactured as a solid piece or as a hollow unit. The device can be manufactured in a number of suitable manners, such as by injection molding.

In accordance with another aspect of the disclosed subject matter, a method of attaching a cable to a structure using the device described above is contemplated herein. The device can be coupled with any suitable cable, such as a utility cable or a bail wire of a drop wire clamp. The utility cable can comprise any cable, such as a double stranded cable or a "figure eight cable" as known in the cable/satellite communication industry. When the device is used with a utility cable, the cable can engage at least one of the first channel, the first portion of the second body channel, and the second portion of the second body channel, as depicted in FIGS. 9-16. When the device is used with a drop wire clamp, the bail wire of the clamp can engage the first channel of the device, as depicted in FIGS. 17-19.

Figure 12:
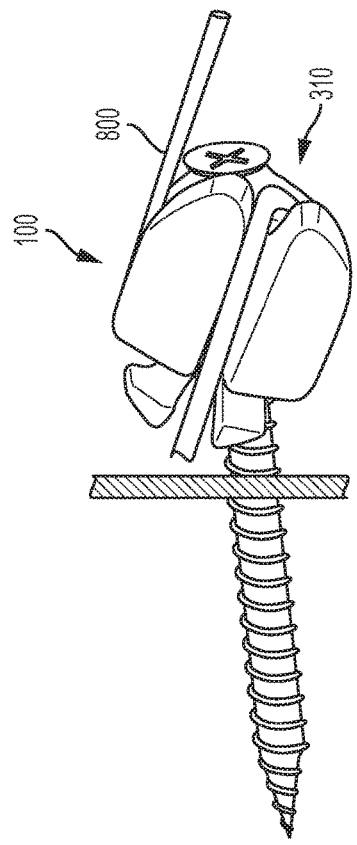
Figure 13:
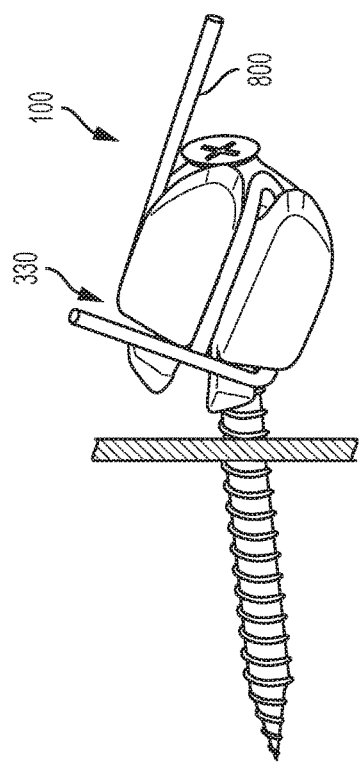
Figure 14:
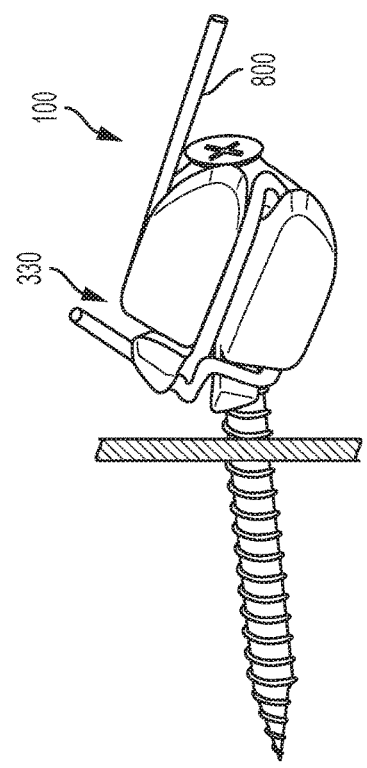
Figure 15:
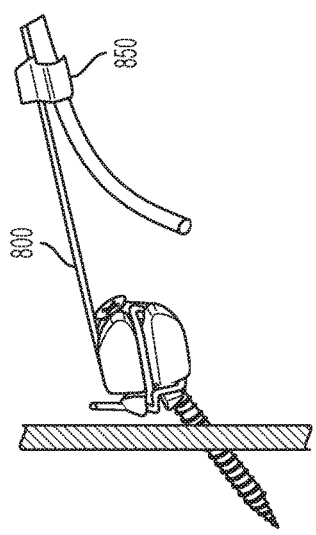
Figure 16:
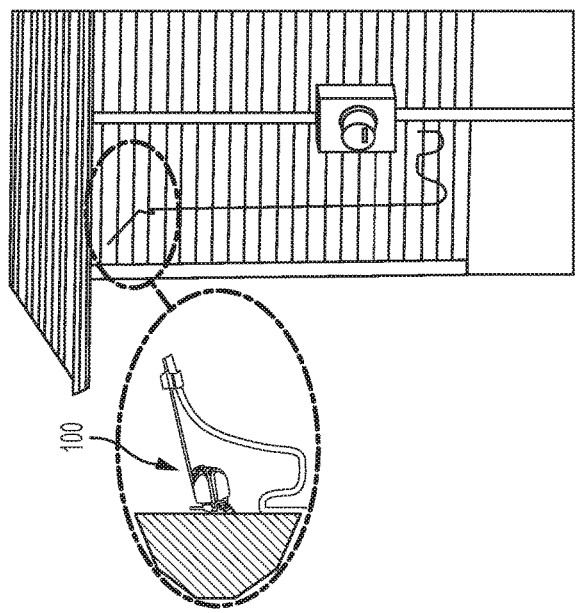

As depicted in the embodiment of FIGS. 9 and 10, the device 100 and the implement 500 are provided, the implement is inserted within the recess 215 from the first end of the first body segment, and the implement is affixed to a structure, such as a house. As shown, the second ends of the first and second body segments are disposed proximate the structure. As demonstrated by FIG. 11, the utility cable 800 is wrapped around the device such that the cable engages the first channel. FIG. 12 shows the feeding of the cable 800 through the first portion of the second body channel. As shown in FIG. 13, the cable 800 is wrapped around the first foot of the first leg and fed through the second portion 330 of the body channel. FIG. 14 depicts the cable as wrapped around the second foot of the second leg. FIG. 15 shows the cable as coupled to the device and subsequently clipped to a second wire with a clip 850. FIG. 16 depicts the affixed device as attached to the structure.

Figure 17:
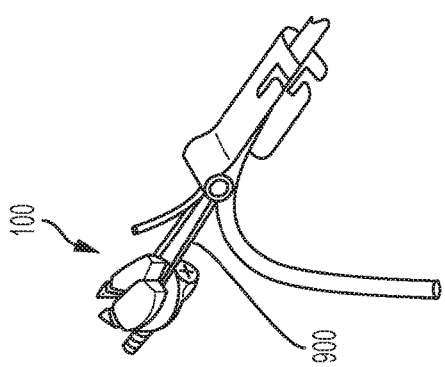
Figure 18:
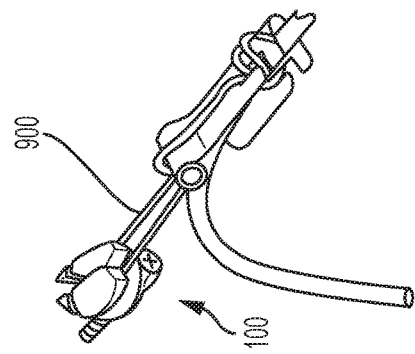

FIGS. 17-19 depict a further embodiment of the device utilized with a clamp, such as drop wire clamp as described by U.S. Pat. No. 6,648,279, the contents of which is herein incorporated by reference in its entirety. FIG. 17 depicts the cable as a bail wire 900 of the clamp as engaged with the first channel of the device. In this embodiment, the second body channel may be unutilized. Alternatively, the second body channel can be further utilized with additional support wires inserted therein and tied to the device. FIG. 18 depicts the device of FIG. 17 with the utility cable properly affixed within the drop wire clamp. FIG. 19 depicts an additional clip utilized with the utility cable for further fixation to the structure.

While the disclosed subject matter is described herein in terms of certain preferred embodiments, those skilled in the art will recognize that various modifications and improvements can be made to the disclosed subject matter without departing from the scope thereof. Moreover, although individual features of one embodiment of the disclosed subject matter can be discussed herein or shown in the drawings of the one embodiment and not in other embodiments, it should be apparent that individual features of one embodiment can be combined with one or more features of another embodiment or features from a plurality of embodiments.

In addition to the various embodiments depicted and claimed, the disclosed subject matter is also directed to other embodiments having any other possible combination of the features disclosed and claimed herein. As such, the particular features presented herein can be combined with each other in other manners within the scope of the disclosed subject matter such that the disclosed subject matter includes any suitable combination of the features disclosed herein. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the device, system and method of the disclosed subject matter without departing from the spirit or scope of the disclosed subject matter. Thus, it is intended that the disclosed subject matter include modifications and variations that are within the scope of the appended claims and their equivalents.

What is claimed is:

1. A device for attaching a cable to a structure using an implement, comprising:
   a first body segment having a first end, a second end, and an inner wall, and defining a recess extending from the first end to the second end, the implement receivable within the recess from the first end and permitted to extend beyond the second end to attach the device to the structure; and
   a second body segment coupled to the first body segment by a joining member, the second body segment having a first end, a second end, an inner wall, a transverse sidewall, and defining a second body channel adapted to receive the cable, wherein the second body segment further includes:
      a first leg having a first foot, the first leg being coupled to the first foot by a linking member, the first leg having a longitudinal sidewall and an inner sidewall, and
      a second leg coupled to the first leg by a mid-member, the second leg having a second foot and coupled to the foot by a linking member, the second leg having a longitudinal sidewall and an inner sidewall, wherein the longitudinal sidewall of the first leg, the longitudinal sidewall of the second leg, and the mid-member define a first portion of the second body channel, wherein the first foot and second foot are disposed at the second end of the second body segment;

wherein the inner sidewalls of the first and second foot, the transverse sidewall of the second body segment, and the linking members of the first and second foot define a second portion of the second body channel;

wherein the inner wall of the first body segment, the inner wall of the second body segment, and the joining member define a first channel adapted to receive the cable.

2. The device according to claim 1, wherein the recess is oriented at an angle with respect to a longitudinal center of the device.

3. The device according to claim 2, wherein the angle can range from approximately 20° to approximately 30°.

4. The device according to claim 1, wherein a diameter of the recess can range from approximately 0.15 inches to approximately 0.3 inches.

5. The device according to claim 1, wherein an interior of the recess includes at least one of a threaded configuration or a smooth configuration.

6. The device according to claim 1, wherein a portion of the first end of the first body segment surrounding the recess includes a sloping surface that is engagable with a surface of an implement.

7. The device according to claim 1, wherein the inner wall of the first body segment is spaced from the inner wall of the second body segment by a distance ranging between approximately 0.14 inches to approximately 0.22 inches.

8. The device according to claim 1, wherein a cable is engagable with the first channel between the inner walls of the first and second body segments.

9. The device according to claim 1, wherein the longitudinal sidewall of the first leg is spaced from the longitudinal sidewall of the second leg by a distance ranging between approximately 0.11 inches to approximately 0.17 inches.

10. The device according to claim 1, wherein a cable is engagable with the first portion of the second body channel between the longitudinal sidewalls of the first and second legs.

11. The device according to claim 1, wherein the transverse sidewall of the second body member is spaced from the inner sidewalls of the first and second foot by a distance ranging between approximately 0.12 inches to approximately 0.2 inches.

12. The device according to claim 1, wherein a cable is engagable with the second portion of the second body channel between the transverse sidewall of the second body member and the inner sidewalls of the first and second foot.

13. The device according to claim 1, wherein the second ends of the first and second body segments are disposed proximate the structure.

14. The device according to claim 1, wherein the device is a monolithic device.

15. The device according to claim 1, wherein the device comprises an insulating material including at least one of polyethylene, polyvinyl chloride (PVC), and polyoxymethylene (POM).

16. The device according to claim 1, wherein the cable comprises at least one of a utility cable or a bail wire of a drop wire clamp.

17. A device system for attaching a cable to a structure, comprising:
a device including
a first body segment having a first end, a second end, and an inner wall, and defining a recess extending from the first end to the second end,
a second body segment coupled to the first body segment by a joining member, the second body segment having a first end, a second end, an inner wall and a second body channel adapted to receive the cable, wherein the inner wall of the first body segment, the inner wall of the second body segment, and the joining member define a first channel adapt to receive the cable, wherein the second body segment further having a transverse sidewall including:
a first leg having a first foot, the first leg being coupled to the first foot by a linking member, the first leg having a longitudinal sidewall and an inner sidewall, and
a second leg coupled to the first leg by a mid-member, the second leg having a second foot and coupled to the foot by a linking member, the second leg having a longitudinal sidewall and an inner sidewall, wherein the longitudinal sidewall of the first leg, the longitudinal sidewall of the second leg, and the mid-member define a first portion of the second body channel, and
wherein the first foot and second foot are disposed at the second end of the second body segment;
wherein the inner sidewalls of the first and second foot, the transverse sidewall of the second body segment, and the linking members of the first and second foot define a second portion of the second body channel; and
an implement receivable within the recess from the first end of the first body segment and permitted to extend beyond the second end of the first body segment to attach the device to the structure.

18. The device system according to claim 17, wherein the implement comprises at least one of a screw, a nail, and a bolt.

19. The device system according to claim 17, wherein the cable is engagable with at least one of the first channel and the second body channel and the cable comprises at least one of a utility cable or a bail wire of a drop wire clamp.

20. A method of attaching a cable to a structure with a device and implement, comprising:
providing a device and an implement, the device including
a first body segment having a first end, a second end, and an inner wall, and defining a recess extending from the first end to the second end,
a second body segment coupled to the first body segment by a joining member, the second body segment having a first end, a second end, an inner wall and a second body channel adapted to receive the cable, wherein the inner wall of the first body segment, the inner wall of the second body segment, and the joining member define a first channel adapt to receive the cable, wherein the second body segment further having a transverse sidewall including:
a first leg having a first foot, the first leg being coupled to the first foot by a linking member, the first leg having a longitudinal sidewall and an inner sidewall, and
a second leg coupled to the first leg by a mid-member, the second leg having a second foot and coupled to the foot by a linking member, the second leg having a longitudinal sidewall and an inner sidewall, wherein the longitudinal sidewall of the first leg, the longitudinal sidewall of the second leg, and the mid-member define a first portion of the second body channel, and wherein the first foot and second foot are disposed at the second end of the second body segment;

wherein the inner sidewalls of the first and second foot, the transverse sidewall of the second body segment, and the linking members of the first and second foot define a second portion of the second body channel;

inserting the implement within the recess from the first end of the first body segment;

affixing the implement to the structure;

wrapping the cable around the device, wherein the cable engages the first channel;

feeding the cable through the first portion of the second body channel;

wrapping the cable around the first foot and feeding the cable through the second portion of the second body channel; and wrapping the cable around the second foot.

* * * * *